(12) United States Patent
Ohtomo

(10) Patent No.: US 7,712,760 B2
(45) Date of Patent: May 11, 2010

(54) TOWING DEVICE FOR ELECTRIC VEHICLE

(75) Inventor: Yosuke Ohtomo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/232,160

(22) Filed: Sep. 11, 2008

(65) Prior Publication Data

US 2009/0078521 A1  Mar. 26, 2009

(30) Foreign Application Priority Data

Sep. 21, 2007 (JP) .............................. P2007-244749

(51) Int. Cl.
*B60D 1/62* (2006.01)
(52) U.S. Cl. .................... 280/422; 180/14.4; 180/53.5; 280/439; 104/87; 104/88.02
(58) Field of Classification Search ................. 280/422, 280/420; 180/14.4, 14.3, 53.5; 104/88.02, 104/87
See application file for complete search history.

(56) References Cited

U.S. PATENT DOCUMENTS

| 3,868,909 | A | * | 3/1975 | Pelabon ...................... 105/1.4 |
| 4,795,859 | A | * | 1/1989 | Kato et al. ...................... 191/4 |
| 5,216,285 | A | * | 6/1993 | Hilsenteger et al. ........... 307/12 |
| 5,443,389 | A | * | 8/1995 | Hughes ........................ 439/35 |
| 5,739,592 | A | * | 4/1998 | Rigsby et al. ................. 307/9.1 |
| 5,920,128 | A |   | 7/1999 | Hines |
| 6,087,739 | A | * | 7/2000 | Jalliffier et al. ............... 307/28 |
| 6,222,443 | B1 |   | 4/2001 | Beeson et al. |
| 6,709,275 | B1 | * | 3/2004 | Ihde ............................ 439/35 |
| 6,970,772 | B2 |   | 11/2005 | Radtke et al. |
| 7,484,689 | B2 | * | 2/2009 | Musial et al. ........... 244/114 R |
| 2002/0163249 | A1 |   | 11/2002 | Palmer et al. |
| 2004/0011918 | A1 | * | 1/2004 | Musial et al. ............... 244/1 R |
| 2008/0121401 | A1 | * | 5/2008 | Posselius et al. ................ 172/1 |

FOREIGN PATENT DOCUMENTS

| EP | 1 234 739 A2 | 8/2002 |
| EP | 1 702 802 A1 | 9/2006 |
| JP | 2002-233003 | 8/2002 |
| JP | 2003-299205 A | 10/2003 |
| WO | 2006/020476 A2 | 2/2006 |

OTHER PUBLICATIONS

European Search Report dated Jun. 5, 2008.

* cited by examiner

*Primary Examiner*—Lesley Morris
*Assistant Examiner*—Tashiana Adams
(74) *Attorney, Agent, or Firm*—McGinn IP Law Group, PLLC

(57) ABSTRACT

When the electric vehicle is to be towed by a towing vehicle, the two vehicles are connected by a connection tool, and a drive motor prioritization control unit is connected to the communication network by a communication cable. Power from a battery is then supplied to the low voltage line by a power supply cable, and the inverter is controlled by a signal from the drive motor prioritization control unit of the towing vehicle.

13 Claims, 6 Drawing Sheets

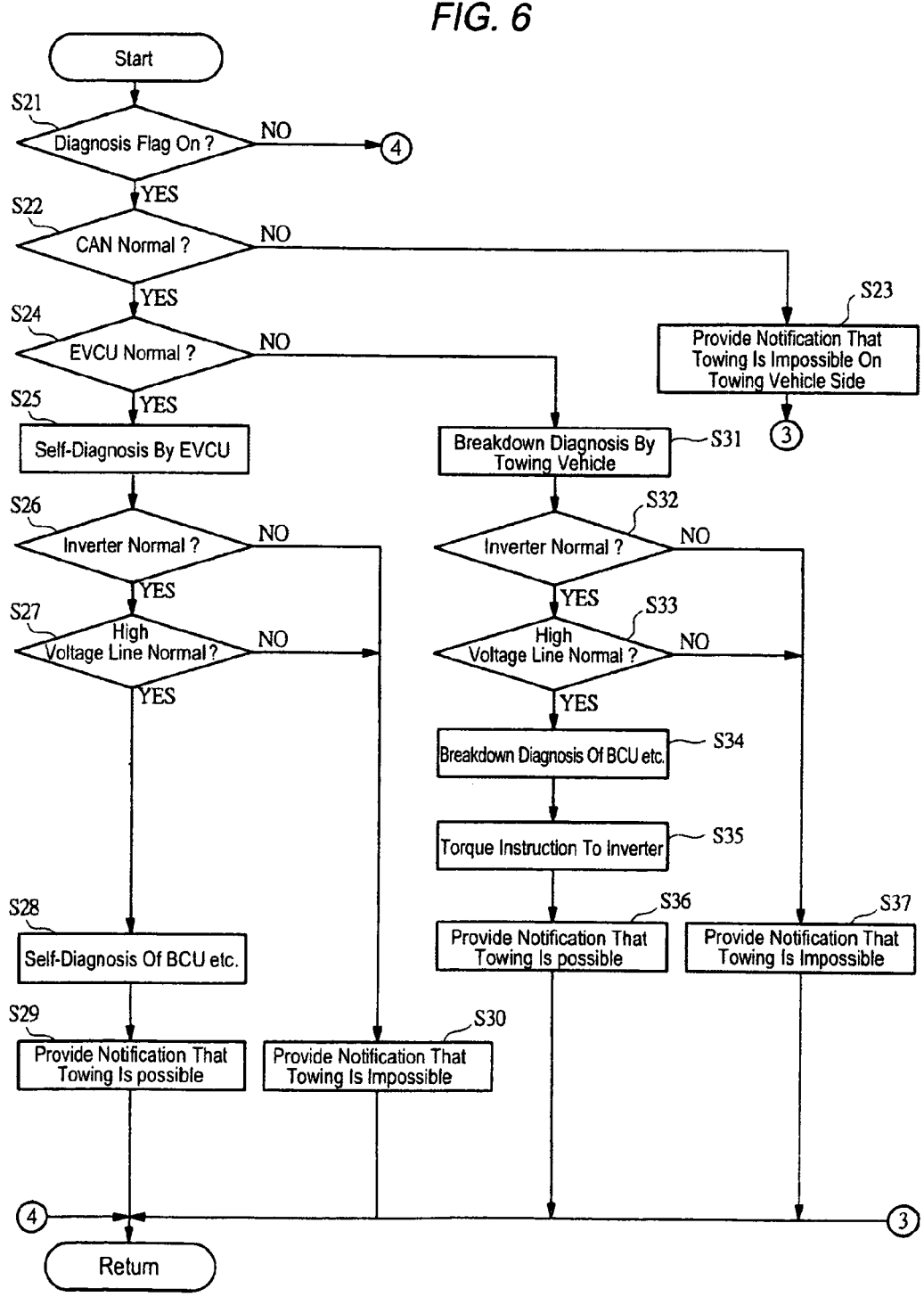

TOWING DEVICE FOR ELECTRIC VEHICLE

CROSS-REFERENCE TO RELATED APPLICATIONS

The disclosure of Japanese Patent Application No. 2007-244749, filed on Sep. 21, 2007 including the specification, drawings and abstract is incorporated herein by reference in its entirety.

BACKGROUND OF THE INVENTION

1. Field of the Invention

The present invention relates to a towing device for an electric vehicle, for towing an electric vehicle, which employs only an electric motor as a drive source, using a towing vehicle when the electric vehicle becomes unable to travel under its own power.

2. Description of the Related Art

In recent years, electric vehicles employing only an electric motor as a drive source have come to public attention amid concerns about preventing atmospheric pollution and reducing vehicle noise. When an electric vehicle becomes unable to travel under its own power due to a breakdown, a different response to that of a vehicle having an internal combustion engine is required. When a vehicle having an internal combustion engine breaks down and the cause of the breakdown is insufficient battery charge, a starter motor can be jump-started using a battery from another vehicle. Hence, depending on the cause of the breakdown, emergency measures can be taken on the spot. When emergency measures cannot be taken, the vehicle can be towed away easily using a towing vehicle.

When an electric vehicle becomes unable to travel under its own power, on the other hand, not only is time required to charge a high voltage battery used to drive the motor, but also, a diagnosis must be made as to whether the breakdown has occurred in a drive system or a control system, which are constituted by electric devices and control devices, and therefore the broken-down vehicle must be placed on a carrier car or towed by a towing vehicle and transported to a repair plant. However, depending on the cause of the breakdown, it may not be desirable to tow a vehicle that cannot travel under its own power due to a breakdown using a towing vehicle. In the case of an electric vehicle, a drive motor for driving vehicle wheels is driven to rotate by the tires when the vehicle is towed, and when the drive motor rotates, counter electromotive force is generated. Depending on the cause of the breakdown, a high voltage may be supplied to an electronic device of the control system as a result, causing damage to the electronic device. Japanese Unexamined Patent Application Publication 2002-233003 describes a power supply device for an electric vehicle having a plurality of batteries, in which power supply to a motor is prevented when a battery breaks.

As noted above, an electric vehicle may break down due to breakage of the various driving devices constituting the drive system or breakage of the various electronic devices constituting the control system, and depending on the cause of the breakdown, an electronic device of the control system may become damaged when the broken-down vehicle is towed. Therefore, the broken-down vehicle is transported to a repair plant on a specialized carrier car, rather than being towed by a towing vehicle. However, depending on the cause of the breakdown, it is possible in many cases to tow the broken-down vehicle without damaging the electronic devices, and in such cases transportation by carrier car is not necessary. By providing a clutch in the drive system of the electric vehicle and ensuring that the clutch is released during towing, the electric motor can be prevented from rotating during towing, and as a result, the generation of counter electromotive force from the electric motor during towing can be prevented. Thus, the electric vehicle can be towed regardless of the type of breakdown. However, a large amount of space must be secured in the drive system to install a towing clutch in the drive system.

SUMMARY OF THE INVENTION

An object of the present invention is to provide a towing device for an electric vehicle with which an electric vehicle can be towed safely when the electric vehicle becomes unable to travel under its own power.

A towing device for an electric vehicle according to the present invention uses a towing vehicle to tow an electric vehicle having a high voltage line for supplying power from a storage device to a drive motor via an inverter, a storage device control unit for controlling the storage device, a vehicle control unit for controlling the drive motor and the high voltage line, a low voltage line for supplying power to the inverter, the storage device control unit, and the vehicle control unit, and a communication network for transmitting a signal between the vehicle control unit, the inverter, and the storage device control unit, and comprises: a connection tool that is mounted between the electric vehicle and the towing vehicle and transmits a towing force of the towing vehicle to the electric vehicle; a communication cable that is connected detachably to a connection terminal connected to the communication network and connects a drive motor prioritization control unit provided in the towing vehicle to the vehicle control unit; and a power supply cable that is connected detachably to a power supply terminal connected to the low voltage line and connects a power source provided in the towing vehicle to the low voltage line.

In the towing device for an electric vehicle according to the present invention, when the electric vehicle is towed by the towing vehicle, towing force is transmitted to the electric vehicle by the tension of the connection tool, and the towing force is not transmitted to the communication cable and the power supply cable.

In the towing device for an electric vehicle according to the present invention, the connection tool comprises tension detecting means for detecting the tension applied to the connection tool during towing and outputting a detection signal to the drive motor prioritization control unit, and when the tension of the connection tool is equal to or greater than a predetermined value, the drive motor prioritization control unit provides notification of a tension abnormality.

In the towing device for an electric vehicle according to the present invention, the drive motor prioritization control unit causes notifying means of the towing vehicle to provide notification that towing is impossible when the communication network is determined to be broken.

In the towing device for an electric vehicle according to the present invention, when the vehicle control unit is determined to be broken by the drive motor prioritization control unit, the drive motor prioritization control unit diagnoses whether or not the inverter and the high voltage line are broken, and when the vehicle control unit is determined to be normal by the drive motor prioritization control unit, the vehicle control unit self-diagnoses whether or not the inverter and the high voltage line are broken. In the towing device for an electric vehicle according to the present invention, when at least one of the inverter and the high voltage line is diagnosed as being broken, notification that towing is impossible is provided on at least one of notifying means provided in the electric vehicle and the notifying means of the towing vehicle, and when both the inverter and the high voltage line are diagnosed as being normal, notification that towing is possible is provided on at least one of the notifying means.

According to the present invention, when the electric vehicle becomes unable to travel under its own power, the connection tool for transmitting the towing force of the towing vehicle to the electric vehicle is connected between the electric vehicle and the towing vehicle, and the communication cable connected to the communication network of the electric vehicle is connected to the power supply cable connected to the low voltage line of the electric vehicle. Therefore, the inverter of the electric vehicle can be controlled by a signal from the drive motor prioritization control unit installed in the towing vehicle. As a result, the electric vehicle can be towed safely without damaging an electronic device installed in the electric vehicle.

By transmitting the towing force of the towing vehicle using the connection tool and ensuring that tension is not applied to the communication cable and power supply cable, power from the towing vehicle can be supplied to an electronic device installed in the electric vehicle while performing communication between the towing vehicle and the electric vehicle, and as a result, the electric vehicle can be towed safely.

A tension sensor for detecting tension is provided in the connection tool, and therefore, when an excessive towing load is applied to the towing vehicle during towing, notification of a tension abnormality is provided on the towing vehicle side. Thus, improper towing can be prevented.

BRIEF DESCRIPTION OF THE DRAWINGS

FIG. 6 is a flowchart showing a sub-routine of a diagnosis step shown in FIG. 5.

DESCRIPTION OF THE PREFERRED EMBODIMENTS

Figure 1:
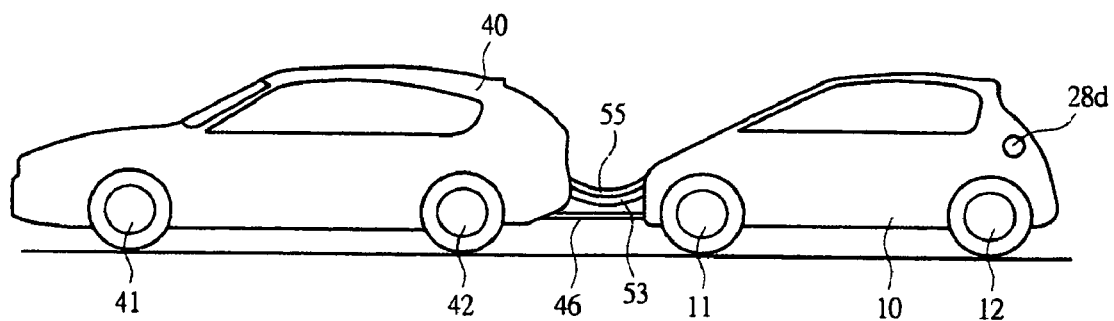
FIG. 1 is a front view showing the outer appearance of an electric vehicle and a towing vehicle connected thereto.

An embodiment of the present invention will be described in detail below on the basis of the drawings. FIG. 1 is a front view showing the outer appearance of an electric vehicle and a towing vehicle connected thereto, and FIG. 2 is a schematic diagram showing the main parts of the electric vehicle and the towing vehicle when connected by a towing device according to an embodiment of the present invention.

Figure 2:
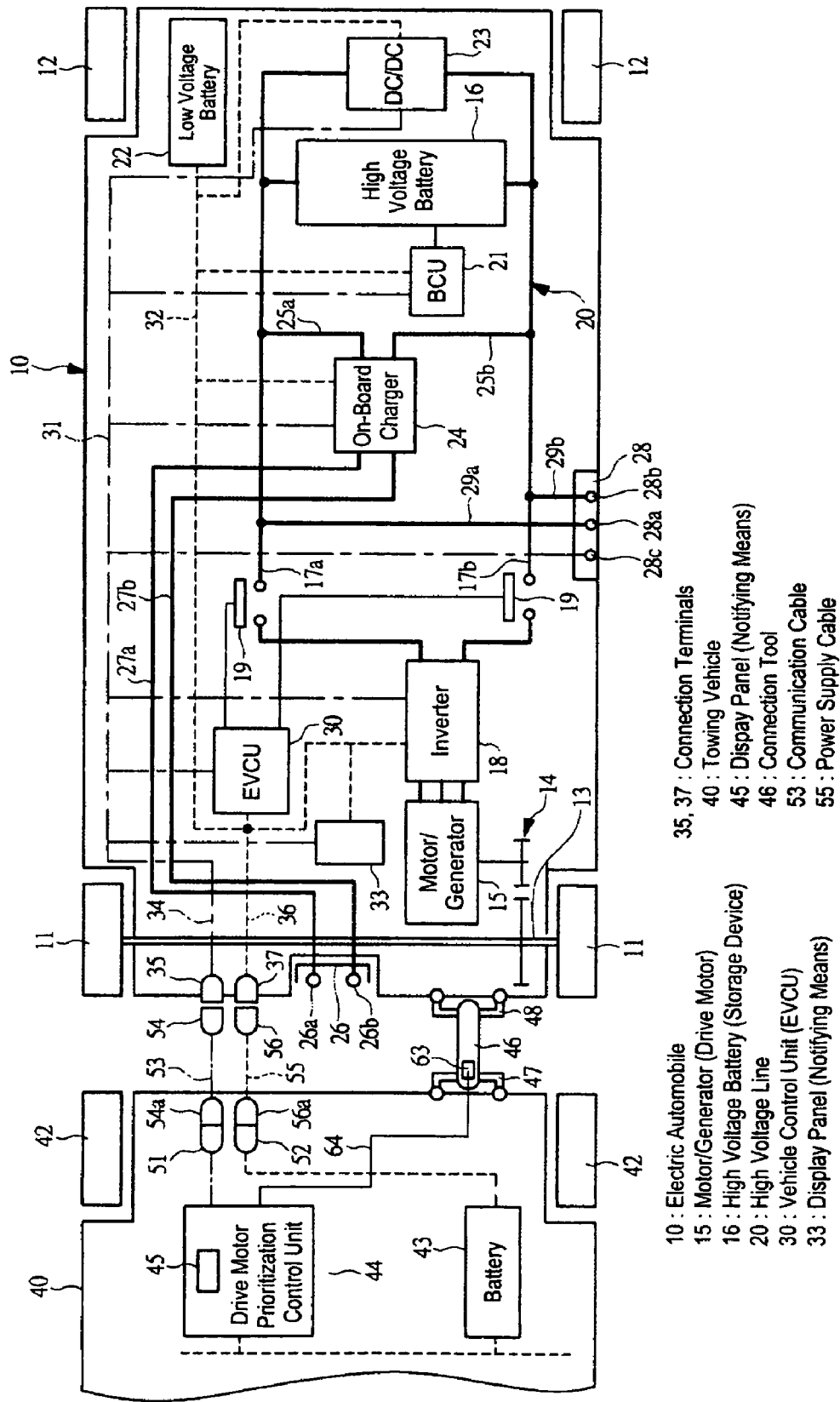
FIG. 2 is a schematic diagram showing the main parts of the electric vehicle and the towing vehicle when connected by a towing device according to an embodiment of the present invention.

A vehicle body of an electric vehicle 10 has drive wheel-side front wheels 11 and driven wheel-side rear wheels 12, and as shown in FIG. 2, a motor/generator 15 serving as a drive motor for driving the vehicle is connected to a drive shaft 13 for driving the front wheels via a gear pair 14 having a fixed gear ratio. The motor/generator 15 is a three-phase alternating current type synchronous motor, and a high voltage battery 16 for supplying power thereto is installed in the vehicle body as a storage device. The high voltage battery 16 employs a lithium ion battery, i.e. a secondary battery, and outputs 400V of direct current power, for example.

The high voltage battery 16 is connected to an inverter 18 via power supply cables 17a, 17b. The inverter 18 converts the direct current from the high voltage battery 16 into a three-phase alternating current and supplies power to the motor/generator 15. The motor/generator 15 has a function for recovering regenerative energy by generating power when the vehicle brakes and charging this power to the high voltage battery 16. The power supply cables 17a, 17b are provided with a main relay 19 for switching between a state in which the high voltage battery 16 and inverter 18 are connected and a state in which the high voltage battery 16 and inverter 18 are disconnected. The power supply cables 17a, 17b for connecting the high voltage battery 16 to the inverter 18 constitute, together with the main relay 19, a high voltage line 20 for supplying power from the high voltage battery 16 to the motor/generator 15 via the inverter 18. In FIG. 2, the high voltage line 20 is indicated by a thick solid line.

A battery control unit (BCU) 21 serving as a storage device control unit is connected to the high voltage battery 16. The battery control unit 21 detects the voltage and current of the high voltage battery 16 in order to detect the state of the battery, such as the remaining capacity.

A low voltage battery 22 is installed in the vehicle body to supply 12V of direct current power, for example, to low voltage operation devices installed in the vehicle such as an audio device, an air-conditioning fan, and a control unit. The low voltage battery 22 is charged by reducing the voltage of the power from the high voltage battery 16 using a DC/DC converter 23. Further, an electric negative pressure brake is provided as a braking device of the electric vehicle 10, and this negative pressure brake is also operated by power from the low voltage battery 22.

An on-board charger 24 is installed in the vehicle body to charge the high voltage battery 16 from an external power source such as a commercial power source, and output terminals of the on-board charger 24 are connected to the high voltage battery 16 by output cables 25a, 25b via the power supply cables 17a, 17b. The on-board charger 24 charges the high voltage battery 16 by boosting an AC 100V or AC 200V external power source voltage, for example, and converting the voltage into a 400V direct current, for example. A connector 26 having connection terminals 26a, 26b is provided on a front end portion of the vehicle body, and the connection terminals 26a, 26b of the connector 26 are connected to the on-board charger 24 by respective power supply cables 27a, 27b. A power supply plug of a power supply cable, not shown in the drawings, connected to the external power source is connected to the connector 26.

A connector 28 having connection terminals 28a, 28b is provided on one side face on a rear portion side of the vehicle body, and the connection terminals 28a, 28b of the connector 28 are directly connected to the power supply cables 17a, 17b by respective power supply cables 29a, 29b. An output cable of a fast charger, not shown in the drawings, serving as an external charger is connected to the connector 28, and the fast charger includes a boost converter that boosts an alternating current supplied from the external power source and converts the boosted alternating current into a 400V direct current, for example. As shown in FIG. 1, the connector 28 is exposed to the exterior of the vehicle by opening a cover 28d provided on the vehicle body.

The inverter 18, main relay 19, on-board charger 24, battery control unit 21, and DC/DC converter 23 are connected to a vehicle control unit (EVCU) 30 by a communication network 31, i.e. a CAN (car area network), and the inverter 18 and other devices exchange signals via the communication network 31. The vehicle control unit 30 ON/OFF controls the main relay 19 via the communication network 31, and controls the operations of various devices such as the inverter 18. The communication network 31 is connected to a signal terminal 28c of the connector 28 such that when an output plug of the fast charger is connected to the connector 28, information relating to the fast charger is transmitted to the vehicle control unit 30 and a control signal is transmitted to the fast charger from the vehicle control unit 30. Further, information such as the voltage and remaining capacity of the high voltage battery 16 is transmitted from the battery control unit 21 to the vehicle control unit 30 via the communication network 31. The vehicle control unit 30 and the battery control unit 21 include a CPU for calculating control signals, ROM for storing a control program, calculation formulae, map data, and so on, and RAM for storing data temporarily.

The vehicle control unit 30, inverter 18, on-board charger 24, battery control unit 21, DC/DC converter 23, and electric negative pressure brake, not shown in the drawings, are connected to the low voltage battery 22 by a low voltage line 32, shown by a broken line in FIG. 2, similarly to the audio device, air-conditioning fan, and so on, not shown in the drawings, so that these devices can be operated by power supplied from the low voltage battery 22. Although the low voltage line 32 includes a plus line and an earth line, it is denoted by a single line in FIG. 2 for convenience.

As described above, the vehicle control unit 30 exchanges information with the inverter 18, the main relay 19 that ON/OFF controls the high voltage line 20, the on-board charger 24, the battery control unit 21, and so on, and therefore has a self-diagnosis function for diagnosing whether an operation device is in a normal state or a broken state on the basis of signals from these operation devices. To realize this function, a self-diagnosis program is stored in the ROM of the vehicle control unit 30, and this self-diagnosis program is read in accordance with a signal from the CPU, whereby self-diagnoses are made as to whether or not the inverter 18 is normal, whether or not the main relay 19 is operating normally, i.e. whether or not the high voltage line 20 is normal, and whether or not any other device connected to the vehicle control unit 30 via the communication network 31 is normal. Hence, providing that the communication network 31 is normal, i.e. not broken, self-diagnoses as to whether the inverter 18, the high voltage line 20, and so on are in a normal state or a broken state are performed via the communication network 31, and notifying means such as a display panel are caused to provide notification of a self-diagnosis result.

As shown in FIG. 2, a display panel 33 for displaying the self-diagnosis result generated by the vehicle control unit 30 is provided on an instrument panel or the like of the electric vehicle 10 as the notifying means.

FIG. 1 shows a state in which the electric vehicle 10, having become unable to travel under its own power, is towed by a towing vehicle 40. The towing vehicle 40 is an automobile having an internal combustion engine for driving at least either front wheels 41 or rear wheels 42. Note, however, that the towing vehicle 40 may be an electric vehicle. As shown in FIG. 2, a battery 43 for outputting an identical voltage to the voltage of the low voltage battery 22 is installed in the towing vehicle 40, and power is supplied to devices such as a starter motor of the towing vehicle 40 from the battery 43.

The towing vehicle 40 is provided with a drive motor prioritization control unit 44. The drive motor prioritization control unit 44 has an identical function to a breakdown diagnosis device or a breakdown diagnosis unit provided in a maintenance factory for diagnosing a breakdown of the electric vehicle 10, and similarly to the vehicle control unit 30, includes ROM storing a breakdown diagnosis program, and a CPU for reading the breakdown diagnosis program and performing diagnoses on operation devices such as the inverter 18. Hence, the drive motor prioritization control unit 44 reads the breakdown diagnosis program in accordance with a signal from the CPU, performs a diagnosis to determine whether or not the inverter 18 and the high voltage line 20 are normal, and determines in accordance with the breakdown condition whether to control the inverter 18 via the vehicle control unit 30 of the electric vehicle 10 or in accordance with a signal from the towing vehicle 40. In other words, the drive motor prioritization control unit 44, which functions as a breakdown diagnosis unit, determines whether to prioritize control of the inverter 18 using the vehicle control unit 30 or to prioritize control of the inverter 18 from the towing vehicle 40 side. The drive motor prioritization control unit 44 is operated by power from the battery 43. The drive motor prioritization control unit 44 may be disposed in a specialized towing vehicle 40, or a transportable drive motor prioritization control unit 44 may be installed in a vehicle in advance, prior to towing, so that the vehicle can be used as the towing vehicle 40.

The drive motor prioritization control unit 44 is provided with a display panel 45 for displaying the breakdown diagnosis result of the electric vehicle 10 as notifying means, similarly to the display panel 33 provided in the electric vehicle 10. Speakers may be used instead of the display panels 33, 45 as the respective notifying means such that notification of the diagnosis result is provided by voice.

When the electric vehicle 10 is to be towed, having become unable to travel under its own power, a connection tool 46 is attached detachably between a rear end portion of the towing vehicle 40 and a tip end portion of the electric vehicle 10 in order to transmit a towing force of the towing vehicle 40 to the electric vehicle. The connection tool 46 includes hook portions 47, 48 on its two end portions, which are fixed to the towing vehicle 40 and the electric vehicle 10.

A connection terminal 35 connected to the communication network 31 via a communication cable 34 and a connection terminal 37 connected to the low voltage line 32 via a power supply cable 36 are provided on a vehicle front end portion of the electric vehicle 10. Meanwhile, a connection terminal 51 connected to the drive motor prioritization control unit 44 via a cable and a connection terminal 52 connected to the battery 43 via a cable are provided on the towing vehicle 40. A connection terminal 54 connected detachably to the connection terminal 35 is provided on a tip end of a communication cable 53 connected to the connection terminal 51. Hence, when the communication cable 53 is connected to the electric vehicle 10, the drive motor prioritization control unit 44 of the towing vehicle 40 is connected to the communication network 31 of the electric vehicle 10. A connection terminal 56 connected detachably to the connection terminal 37 is provided on a tip end of a power supply cable 55 connected to the connection terminal 52. Hence, when the power supply cable 55 is connected to the electric vehicle 10, the battery 43 serving as the power source of the towing vehicle 40 is connected to the low voltage line 32 of the electric vehicle 10. The communication cable 53 is connected to the connection terminal 51 by a connection terminal 54a provided on a base end portion thereof, and the power supply cable 55 is connected to the connection terminal 52 by a connection terminal 56a provided on a base end portion thereof. However, the communication cable 53 may be connected directly to the drive motor prioritization control unit 44, and the power supply cable 55 may be connected directly to the battery 43.

As shown in FIG. 1, when the electric vehicle 10 is to be towed by the towing vehicle 40, having become unable to travel under its own power, the electric vehicle 10 is connected to the towing vehicle 40 by the connection tool 46 such that the towing force of the towing vehicle 40 is transmitted to the electric vehicle 10 by the connection tool 46, and the electric vehicle 10 is electrically connected to the towing vehicle 40 by the communication cable 53 and the power supply cable 55. The communication cable 53 and the power supply cable 55 are set to be sufficiently longer than the connection tool 46 to ensure that when the towing force is transmitted by the connection tool 46 at this time, the towing force is not transmitted to these cables.

Figure 3A:
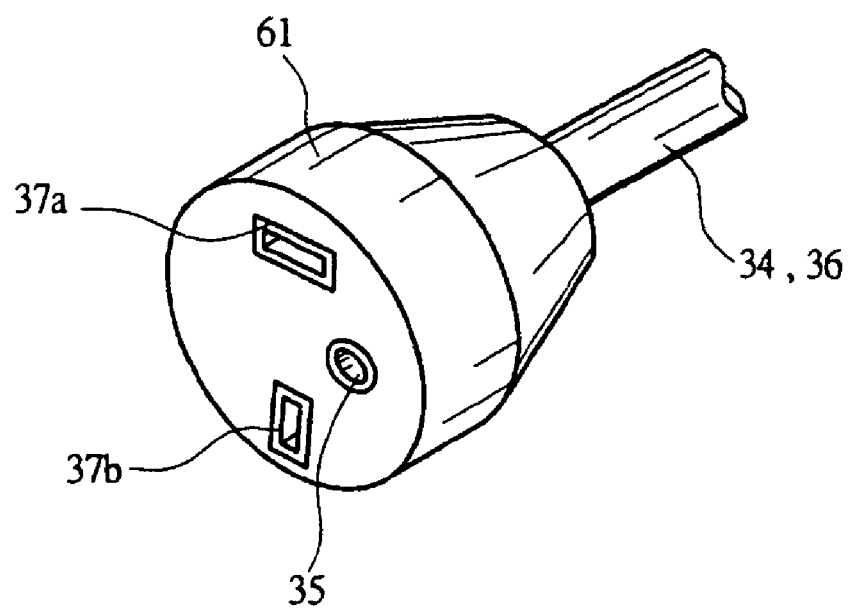
FIG. 3A is a perspective view showing a connector provided in the electric vehicle.
Figure 3B:
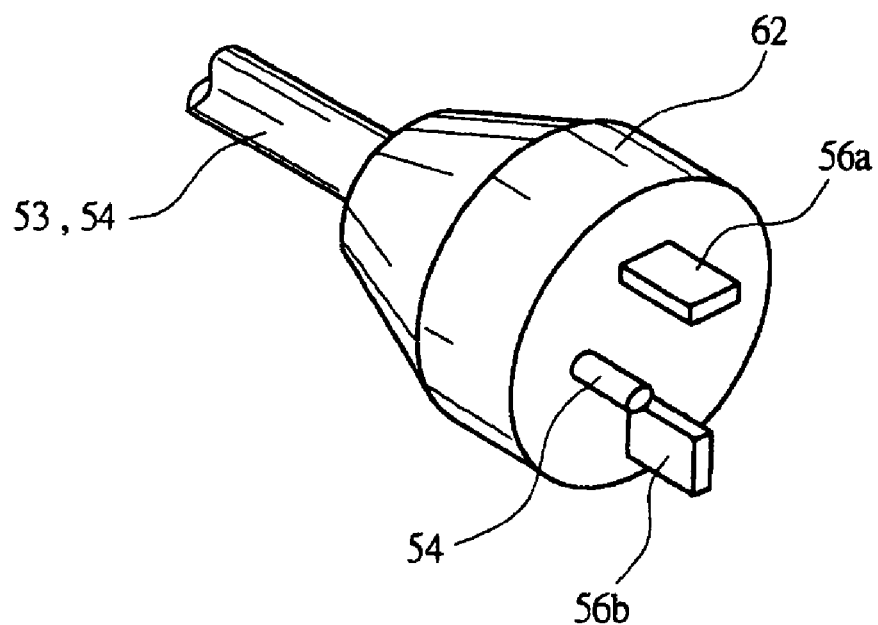
FIG. 3B is a perspective view showing a connection plug provided on a tip end of a communication cable and a power supply cable.

FIG. 3A is a perspective view showing a connector 61 provided in the electric vehicle 10, and FIG. 3B is a perspective view showing a connection plug 62 provided on a tip end of the communication cable 53 and the power supply cable 55.

The connector 61 is provided with the connection terminal 35, which is connected to the communication network 31 via the communication cable 34, and a plus side connection terminal 37a and an earth side connection terminal 37b, which are connected to the low voltage line 32 via the power supply cable 36 and together constitute the connection terminal 37. The connection terminals 35, 37a, 37b are respectively formed with a fitting hole constituted by a conductive member. Meanwhile, the connection plug 62 is provided with a rod-shaped connection terminal 54 that is inserted into the fitting hole of the connection terminal 35, and plate-shaped connection terminals 56a, 56b that are respectively inserted into the fitting holes of the connection terminals 37a, 37b. Thus, the communication connection terminal 54 and the power supply connection terminals 56a, 56b are assembled on the connection plug 62, and the communication cable 53 and power supply cable 55 are combined. However, the respective cables may be connected separately. In this case, the connection terminal 35 and the connection terminals 37a, 37b are disposed separately in the electric vehicle 10.

When the electric vehicle 10 is towed by the towing vehicle 40, the towing force of the towing vehicle 40 is transmitted to the electric vehicle 10 by the connection tool 46, and the drive motor prioritization control unit 44 provided in the towing vehicle 40 is connected to the communication network 31 of the electric vehicle 10 via the communication cable 53. Further, the battery 43 of the towing vehicle 40 is connected to the low voltage line 32 of the electric vehicle 10 via the power supply cable 55, and therefore, even when the low voltage battery 22 breaks, power can be supplied from the battery 43 of the towing vehicle 40 to devices that are operated by power from the low voltage line 32, such as the vehicle control unit 30 of the electric vehicle 10.

As long as the communication network 31 of the electric vehicle 10 is normal, a breakdown diagnosis can be performed on the electric vehicle 10 by the drive motor prioritization control unit 44 when the vehicle control unit 30 is broken, and thus the reason why the electric vehicle 10 cannot travel under its own power can be diagnosed. The breakdown diagnosis performed by the drive motor prioritization control unit 44 determines whether or not the inverter 18 is normal and whether or not the high voltage line 20 is normal. Diagnoses are also performed on other operation devices connected via the communication network 31 to determine whether or not the battery control unit 21 is normal, whether or not the capacity of the high voltage battery 16 is deficient, whether or not the DC/DC converter 23 is normal, and so on.

When the diagnosis result indicates that the inverter 18 and the high voltage line 20 are normal, notification that the electric vehicle 10 can be towed is provided on one or both of the display panel 45 of the drive motor prioritization control unit 44 and the display panel 33 of the electric vehicle 10 via the communication network 31, and a control signal is transmitted to the inverter 18 from the drive motor prioritization control unit 44 to issue a torque instruction to the inverter in order to prevent counter electromotive force from being transmitted to the high voltage line 20. When one or both of the inverter 18 and the high voltage line 20 is diagnosed as being broken, on the other hand, at least one of the two display panels 33, 45 provides notification that towing is impossible.

When the communication network 31 and the vehicle control unit 30 of the electric vehicle 10 are normal, the vehicle control unit 30 exhibits the self-diagnosis function described above, and therefore a breakdown diagnosis, or in other words a self-diagnosis, can be performed in relation to the inverter 18 and the high voltage line 20 by the vehicle control unit 30, and a self-diagnosis can also be performed in relation to other operation devices connected via the communication network 31. When the inverter 18 and the high voltage line 20 are determined to be normal as a result of the self-diagnosis by the vehicle control unit 30, notification that towing is possible is provided on the display panel 33 of the electric vehicle 10 via the communication network 31, and a control signal is transmitted to the inverter 18 from the vehicle control unit 30 to issue a torque instruction to the inverter 18 in order to prevent counter electromotive force from being transmitted to the high voltage line 20. When one or both of the inverter 18 and the high voltage line 20 is diagnosed as being broken, on the other hand, the display panel 33 of the electric vehicle displays notification that towing is impossible. Note that in either case, notification of the diagnosis result may also be provided on the display panel 45 of the drive motor prioritization control unit 44.

When the drive motor prioritization control unit 44 determines via the communication cable 53 that the communication network 31 is broken during towing, a message indicating that towing is impossible is displayed on the display panel 45 of the towing vehicle 40.

The connection tool 46 is provided with tension detecting means 63 for detecting a tension applied to the connection tool 46 when the drive motor prioritization control unit 44 or the vehicle control unit 30 determines that towing by the towing vehicle 40 is possible and the electric vehicle is towed as described above, and a detection signal from the tension detecting means 63 is transmitted to the drive motor prioritization control unit 44 via a signal cable 64. When the tension applied to the connection tool 46 is equal to or greater than a predetermined value, the drive motor prioritization control unit 44 causes the respective display panels 33, 45 serving as notifying means to provide notification of a tension abnormality.

Figure 4A:
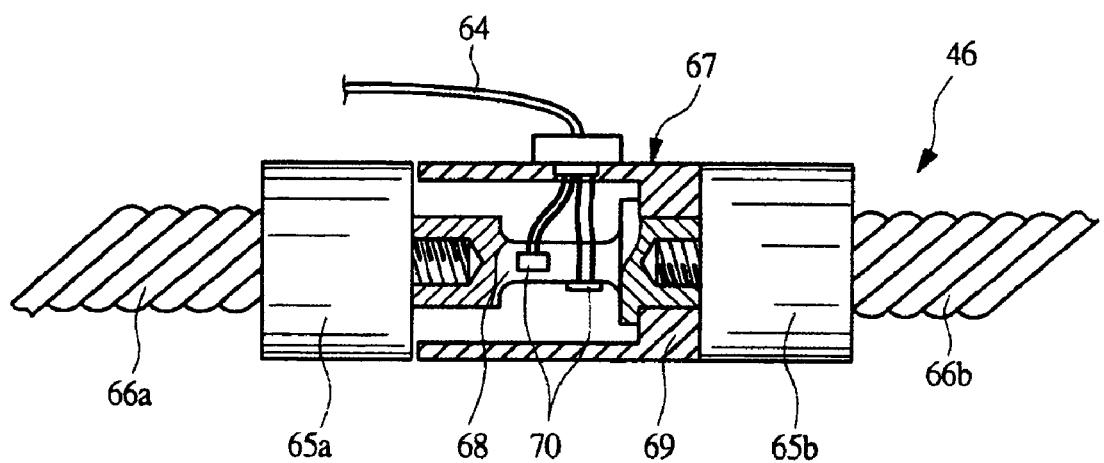
FIG. 4A is a partially cut away front view showing an example of a connection tool.
Figure 4B:
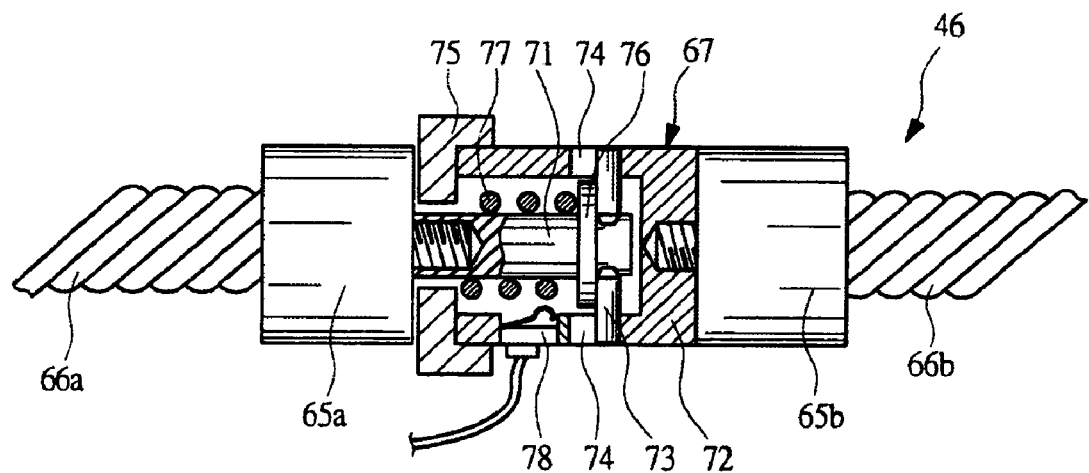
FIG. 4B is a partially cut away front view showing a modified example of the connection tool.

FIG. 4A is a partially cut away front view showing an example of the connection tool 46, and FIG. 4B is a partially cut away front view showing a modified example of the connection tool 46. Each of these drawings is a partial view of the connection tool 46.

The connection tool 46 shown in FIG. 4A includes wires 66a, 66b. Joint portions 65a, 65b are attached to one end portion of the respective wires 66a, 66b, a hook portion 47 is attached to the other end portion of the wire 66a, and a hook portion 48 is attached to the other end portion of the wire 66b. A tension detector 67 is mounted between the two joint portions 65a, 65b. The tension detector 67 includes an elastic rod member 68, the two end portions of which are screwed to the respective joint portions 65a, 65b, and the elastic rod member 68 is covered by a case 69. A tension sensor 70 constituted by a plurality of distortion gauges is adhered to the elastic rod member 68 as the tension detecting means 63, and when the elastic rod member 68 is subjected to elastic deformation by the tension applied to the connection tool 46, the resulting distortion is converted into an electric signal by a bridge circuit including the tension sensor 70 constituted by the distortion gauges. This electric signal is then transmitted to the drive motor prioritization control unit 44 by the signal cable 64.

The connection tool 46 shown in FIG. 4B includes the wires 66a, 66b, similarly to the connection tool 46 shown in FIG. 4A. The tension detector 67 mounted between the two joint portions 65a, 65b includes an operating rod 71 screwed to one joint portion 65a and a case 72 that is screwed to the other joint portion 65b and covers the operating rod 71, whereby the operating rod 71 is free to move axially within the case 72. A guide groove 74, into which a guide pawl 73 fixed to the operating rod 71 is inserted, is formed in the case 72 to guide the axial direction movement of the operating rod 71. A spring member 77 constituted by a compression coil spring is mounted between a cover 75 fixed to the case 72 and a flange 76 provided on a tip end portion of the operating rod 71. A microswitch that is operated by the flange 76 so as to output a signal when tension of at least a predetermined value is applied to the connection tool 46 such that the spring member 77 is compressed by at least a predetermined stroke is attached to the case 72 as a tension sensor 78. The signal from the tension sensor 78 constituted by the microswitch is transmitted to the drive motor prioritization control unit 44 by the signal cable 64.

Hence, when the towing vehicle 40 and the electric vehicle 10 are connected by the connection tool 46 shown in FIG. 4A, the drive motor prioritization control unit 44 determines that the tension applied to the connection tool 46 is equal to or greater than the predetermined value on the basis of the signal transmitted from the tension sensor 70 by the signal cable 64. On the other hand, when the towing vehicle 40 and the electric vehicle 10 are connected by the connection tool 46 shown in FIG. 4B, the drive motor prioritization control unit 44 determines that the tension applied to the connection tool 46 is equal to or greater than the predetermined value on the basis of an ON signal from the tension sensor 78. After determining that the tension applied to the connection tool 46 is equal to or greater than the predetermined value, the drive motor prioritization control unit 44 causes the respective display panels 33, 45 serving as notifying means to provide notification of a tension abnormality.

The wires 66a, 66b of the connection tool 46 may be constituted by any type of wire member, such as a chain or a rope, and one of the hook portions 47 and 48 may be attached directly to one of the joint portions 65a and 65b. Furthermore, the communication cable 53 and power supply cable 55 may be combined in the connection tool 46, and in this case, the communication cable 53 and power supply cable 55 are set to be sufficiently longer than the connection tool 46 to ensure that tension is not applied to the respective cables 53, 55 during towing.

Figure 5:
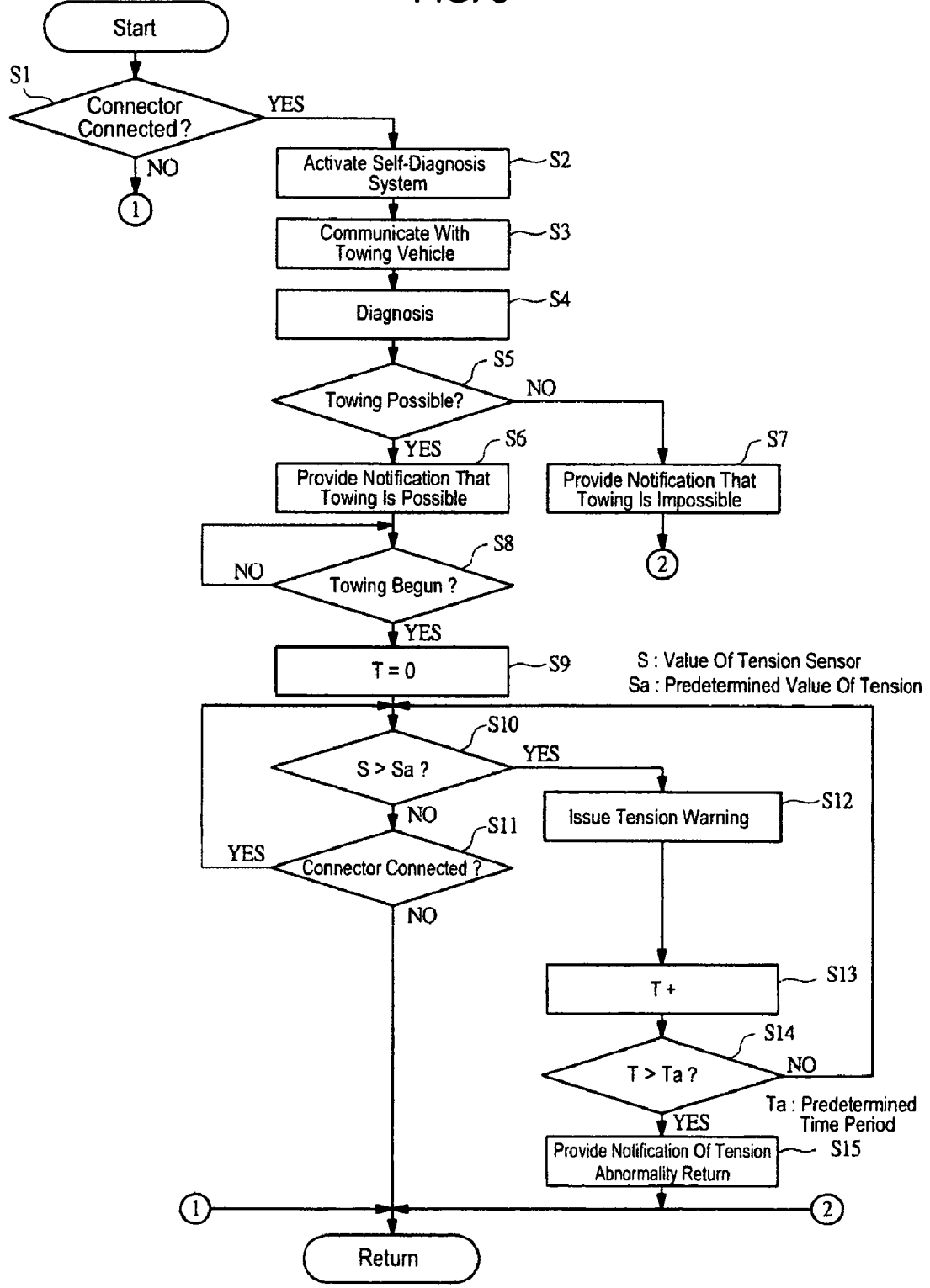
FIG. 5 is a main flowchart showing an algorithm of a towing operation executed by the towing device for the electric vehicle.

FIG. 5 is a main flowchart showing an algorithm of a towing operation executed by the towing device for the electric vehicle, and FIG. 6 is a flowchart showing a sub-routine of a diagnosis step shown in FIG. 5.

During towing, the towing vehicle 40 is connected to the electric vehicle 10, i.e. the towed vehicle that can no longer travel under its own power, by the connection tool 46, and the communication cable 53 and power supply cable 55 are connected. When power from the battery 43 is supplied to the drive motor prioritization control unit 44 installed in the towing vehicle 40 in this state such that the drive motor prioritization control unit 44 is activated, a determination is made in a step S1 as to whether or not the connection plug 62 is connected to the connector 61 of the electric vehicle 10. When the power supply cable 55 is connected to the connection terminal 37, the earth line of the power supply cable 55 is connected to the earth line of the low voltage line 32 to form a shared earth line, and therefore this determination may be made by monitoring the plus side voltage of the power supply cable 55 using an A/D converter and determining that the connection plug 62 is connected to the connector 61 when the monitored voltage reaches or exceeds a fixed voltage. When the connection plug 62 is connected to the connector 61, the vehicle control unit 30 of the electric vehicle 10 is connected to the battery 43 via the power supply cable 55, and the drive motor prioritization control unit 44 is connected to the communication network 31 via the communication cable 53. Thus, the self-diagnosis system incorporated into the vehicle control unit 30 is activated, and the towing vehicle 40 is communicably connected to the electric vehicle 10 serving as the towed vehicle (steps S2, S3). A diagnosis step is then executed in a step S4. As will be described below, the sub-routine shown in FIG. 6 is executed in the diagnosis step.

When it is determined as a result of the diagnosis step shown in FIG. 6 that towing is possible in a step S5, the display panel 33 of the electric vehicle 10 and the display panel 45 of the towing vehicle 40 provide notification that towing is possible (step S6), and when it is determined that towing is not possible, the respective display panels 33, 45 provide notification that towing is impossible (step S7).

When it is determined in a step S8 that towing of the electric vehicle 10 by the towing vehicle 40 has begun, a timer T is initialized (step S9). When the connection tool 46 shown in FIG. 4A is used, a signal from the tension sensor 70 provided in the connection tool 46 is read in a step S10 to determine whether or not a detection value S from the tension sensor is greater than a predetermined value Sa. When it is determined that the detection value S from the tension sensor 70 is equal to or smaller than the predetermined value Sa, and it is determined that the connector is connected in a step S11, the display panels 33, 45 continue to provide notification that towing is possible.

When it is determined in the step S10 that the tension S is greater than the predetermined value Sa, on the other hand, a tension warning is issued to the towing vehicle side and the electric vehicle side in a step S12. In a step S13, the timer is incremented, and in a step S14, a determination as to whether or not the tension S equals or exceeds the predetermined value Sa is made repeatedly over a predetermined time period Ta. When the tension does not fall to or below the predetermined value during the predetermined time period Ta, notification of a tension abnormality is provided in a step S15. Note that instead of determining whether or not the tension S is greater than the predetermined value Sa repeatedly over the predetermined time period Ta in the step S14, notification of a tension abnormality may be provided when a set number of repeated determinations is reached.

In the diagnosis processing of the step S4, as shown in FIG. 6, a determination as to whether or not the communication network 31 of the electric vehicle 10 is normal (step S22) is made once it has been determined in a step S21 that a diagnosis flag is ON. When it is determined that the communication network 31 is not normal, a step S23 is executed, whereby notification that towing is impossible is provided on the display panel 45 of the towing vehicle 40.

In a step S24, a determination is made as to whether or not the vehicle control unit (EVCU) 30 is normal, and when it is determined that the vehicle control unit 30 is normal, self-diagnosis of the electric vehicle 10 is executed preferentially by the vehicle control unit 30 (step S25). Determinations are then made by the vehicle control unit 30 as to whether or not the inverter 18 is normal and whether or not the high voltage line 20 is normal (steps S26, S27). When both the inverter 18 and the high voltage line 20 are normal, self-diagnoses are made in a step S28 as to whether or not the battery control unit (BCU) and so on are normal, whereupon notification that towing is possible is provided on the display panels 33, 45 (step S29). In addition to alphabetic characters indicating that towing is possible, an instruction to operate an operating lever of the electric vehicle 10 to a neutral (N) range and tow the electric vehicle 10 at a speed of 40 km/h, for example, maybe issued through alphabetic characters or a voice.

When it is determined in the steps S26 and S27 that at least one of the inverter 18 and the high voltage line 20 is not normal, the display panels 33, 45 provide notification that towing is impossible (step S30). Note that in the steps S29 and S30, notification that towing is possible may be provided on only one of the display panel 33 of the electric vehicle 10 and the display panel 45 of the drive motor prioritization control unit 44.

When it is determined in the step S24 that the vehicle control unit 30 of the electric vehicle 10 is not normal, on the other hand, a breakdown diagnosis is executed preferentially by the drive motor prioritization control unit 44 of the towing vehicle 40 via the communication network 31 (step S31), whereupon determinations are made by the drive motor prioritization control unit 44 as to whether or not the inverter 18 is normal and whether or not the high voltage line 20 is normal (steps S32, S33), similarly to the self-diagnosis described above. When both the inverter 18 and the high voltage line 20 are normal, self-diagnoses are made as to whether or not the battery control unit (BCU) and so on are normal, a torque instruction is issued to the inverter 18, and notification that towing is possible is provided on the display panels 33, 45 (steps S34 to S36). When it is determined in the steps S32 and S33 that at least one of the inverter 18 and the high voltage line 20 is not normal, on the other hand, the display panels 33, 45 provide notification that towing is impossible (step S37) In this case, the notification that towing is possible may be provided on the display panel 45 of the drive motor prioritization control unit 44 alone.

When towing is determined to be possible following execution of the diagnosis processing shown in FIG. 6, the processing of the step S8 onward in FIG. 5 is executed.

The present invention is not limited to the embodiment described above, and may be subjected to various modifications within a scope that does not depart from the spirit thereof. For example, in the illustrated electric vehicle, the front wheels 11 serve as the drive wheels, but the rear wheels 12 may be used as the drive wheels. Further, a lithium ion battery is used as the high voltage battery 16, but another type of secondary battery, for example an electrochemical capacitor such as an electric double layer capacitor, may be used instead.

What is claimed is:

1. A towing device for an electric vehicle, which uses a towing vehicle to tow the electric vehicle, the electric vehicle including a high voltage line for supplying power from a storage device to a drive motor via an inverter, a storage device control unit for controlling said storage device, a vehicle control unit for controlling said drive motor and said high voltage line, a low voltage line for supplying power to said inverter, said storage device control unit, and said vehicle control unit, and a communication network for transmitting a signal between said vehicle control unit, said inverter, and said storage device control unit, said towing device comprising:

a connection tool mounted between said electric vehicle and said towing vehicle and transmitting a towing force of said towing vehicle to said electric vehicle;

a communication cable connected detachably to a connection terminal connected to said communication network and connecting a drive motor prioritization control unit provided in said towing vehicle to said vehicle control unit; and a power supply cable connected detachably to a power supply terminal connected to said low voltage line and connecting a power source provided in said towing vehicle to said low voltage line.

2. The towing device for an electric vehicle according to claim 1, wherein, if said electric vehicle is towed by said towing vehicle, then said towing force is transmitted to said electric vehicle by a tension of said connection tool, and said towing force is not transmitted to said communication cable and said power supply cable.

3. The towing device for an electric vehicle according to claim 1, wherein said connection tool comprises tension detecting means for detecting a tension applied to said connection tool during towing and outputting a detection signal to said drive motor prioritization control unit, and if said tension of said connection tool is equal to or greater than a predetermined value, then said drive motor prioritization control unit provides notification of a tension abnormality.

4. The towing device for an electric vehicle according to claim 1, wherein said drive motor prioritization control unit causes a notifying means provided in said towing vehicle to provide notification that towing is impossible if said communication network is determined to be broken.

5. The towing device for an electric vehicle according to claim 4, wherein, if said vehicle control unit is determined to be broken by said drive motor prioritization control unit, then said drive motor prioritization control unit diagnoses whether or not said inverter and said high voltage line are broken, and if said vehicle control unit is determined to be normal by said drive motor prioritization control unit, then said vehicle control unit self-diagnoses whether or not said inverter and said high voltage line are broken.

6. The towing device for an electric vehicle according to claim 5, wherein, if at least one of said inverter and said high voltage line is diagnosed as being broken, then notification that towing is impossible is provided on at least one of a second notifying means provided in said electric vehicle and said notifying means of said towing vehicle, and if both said inverter and said high voltage line are diagnosed as being normal, then notification that towing is possible is provided on at least one of said notifying means and said second notifying means.

7. The towing device for an electric vehicle according to claim 1, wherein, if said drive motor prioritization control unit determines at least one of said communication system, said inverter and high voltage line is broken, then said drive motor prioritization control unit provides notification that towing is impossible to at least one of a notifying means provided in said towing vehicle and a second notifying means provided in said electric vehicle.

8. The towing device for an electric vehicle according to claim 1, wherein said drive motor prioritization control unit controls said inverter of the electric vehicle.

9. The towing device for an electric vehicle according to claim 1, wherein said drive motor prioritization control unit determines if said electric vehicle is towable without causing damage to an electrical system of said electric vehicle.

10. A towing device for an electric vehicle, which uses a towing vehicle to tow the electric vehicle, said towing device comprising:
   a connection tool that is mounted between said electric vehicle and said towing vehicle and transmits a towing force of said towing vehicle to said electric vehicle;
   a communication cable that is detachably connected to a connection terminal connected to a communication network, said communication network transmitting a signal between a vehicle control unit, an inverter, and a storage device control unit of said electric vehicle, and connecting a drive motor prioritization control unit provided in said towing vehicle to said vehicle control unit; and
   a power supply cable that is connected detachably to a power supply terminal connected to a low voltage line and connects a power source provided in said towing vehicle to said low voltage line,
   wherein said electric vehicle includes:
      a high voltage line for supplying power from the storage device to a drive motor via the inverter; and
      a storage device controlled by the storage device control unit,
      wherein the vehicle control unit controls said drive motor and said high voltage line, and
      wherein said low voltage line supplies power to said inverter.

11. The towing device for an electric vehicle according to claim 5, wherein, if both said inverter and said high voltage line are diagnosed as being normal, then said drive motor prioritization control unit controls said inverter of said electric vehicle.

12. The towing device for an electric vehicle according to claim 1, wherein a low voltage power is supplied to the electric vehicle from the towing vehicle.

13. The towing device for an electric vehicle according to claim 3, wherein said tension detecting means includes an elastic rod member and a plurality of distortion gauges connected to the elastic rod member.

\* \* \* \* \*